(12) United States Patent
Schuster et al.

(10) Patent No.: US 6,417,976 B1
(45) Date of Patent: Jul. 9, 2002

(54) APPARATUS AND METHOD TO MOUNT ELECTRO-OPTIC SYSTEMS

(75) Inventors: John J. Schuster, Bellevue; Richard B. Riday, Kirkland; Eric J. Davis, Redmond; James S. Webb, Seattle; Randy Hulett, Seattle; Derek Schulte, Seattle, all of WA (US)

(73) Assignee: Terabeam Corporation, Kirkland, WA (US)

( * ) Notice: Subject to any disclaimer, the term of this patent is extended or adjusted under 35 U.S.C. 154(b) by 0 days.

(21) Appl. No.: 09/801,030

(22) Filed: Mar. 6, 2001

(51) Int. Cl.⁷ .................................................. G02B 7/02
(52) U.S. Cl. ........................ 359/822; 359/813; 359/823
(58) Field of Search ................................ 359/810, 811, 359/813, 818, 820, 823, 824, 627, 629, 159, 172, 822; 353/100; 396/529

(56) References Cited

U.S. PATENT DOCUMENTS

| | | | | |
|---|---|---|---|---|
| 5,353,167 A | * | 10/1994 | Kuklo et al. ................ 359/876 |
| 5,986,827 A | * | 11/1999 | Hale ........................... 359/822 |
| 6,086,209 A | * | 7/2000 | Miyahara et al. ............ 359/872 |
| 6,175,451 B1 | * | 1/2001 | Iriyama et al. .............. 359/627 |
| 6,259,571 B1 | * | 7/2001 | Holder et al. ............... 359/819 |
| 6,311,478 B1 | * | 11/2001 | Vicario et al. ................. 60/22 |

* cited by examiner

*Primary Examiner*—Georgia Epps
*Assistant Examiner*—Saeed Seyrafi
(74) *Attorney, Agent, or Firm*—Blakely Sokoloff Taylor & Zafman LLP

(57) ABSTRACT

A mount for an electro-optic system, such as an optical transceiver system, is usable to compensate for motion that affects alignment with respect to an optical communication signal. The mount can include inner and outer elements having pivots spaced 90 degrees apart relative to each other. The outer element is fixed, and the inner element is capable of movement. The electro-optic system is pivotally coupled to the inner element. A first set of pivot elements between the inner element and the outer element allows rotation about a first axis, while a second set of pivot elements between the electro-optic system and the inner element allows rotation about a second axis, which may be orthogonal to the first axis.

14 Claims, 3 Drawing Sheets

APPARATUS AND METHOD TO MOUNT ELECTRO-OPTIC SYSTEMS

BACKGROUND OF THE INVENTION

1. Field of the Invention

The present invention relates generally to electro-optic systems, and in particular but not exclusively, relates to the mounting of electro-optic systems.

2. Background Information

An alternative to hardwired or fiber network communication solutions is the use of wireless optical communications. Wireless optical communications utilize point-to-point communications through free space and therefore do not require the routing of cables or fibers between locations. Thus, wireless optical communications are also known as free space or atmospheric optical communications. For instance, in a free space optical communication system, a beam of light is directed through free space from a transmitter at a first location to a receiver at a second location. Data or information is encoded into the beam of light, and therefore, the information is transmitted through free space from the first location to the second location.

An important aspect of a free space optical communications system is pointing and tracking. In particular, it is important that the optical communications beam (e.g., laser beam) is aimed properly from the transmitter at the first location and that the receiver at the second location is aligned properly to receive the optical communications beam. For example, assume that a transmitter is mounted on a first building and that a receiver is mounted on a different second building. Assume further that there is a line of sight between the transmitter and receiver. It is important for the transmitter on the first building to be configured to accurately direct or aim the optical communications beam at the receiver on the second building.

Tracking is utilized for maintaining the alignment of the optical communications beam between the transmitter and receiver in various situations or disturbances. Examples of these various situations or disturbances include, building twist and tilt due to thermal expansion from non-uniform solar loading, the swaying of the buildings due to for example windy conditions, vibration of the platforms on which the transmitter and/or receiver are mounted, atmosphere-induced beam steering, etc. If the tracking system is unable to compensate for disturbances, the optical communications beam is no longer properly aimed at the receiver and, consequently, communications between the transmitter and receiver are lost or impaired.

These types of motions that affect the alignment of the communications beam are typically small in magnitude and occur at slow rates. Some types of telecommunications systems use yoke structures to perform positioning adjustments. However, these yoke structures often are not capable of very small and precise movements over a limited field-of-regard. Additionally, yoke structures and other mechanisms that perform positional adjustments using motorized tracking mounts often have multiple parts that require complex controls, are expensive to manufacture, are bulky and cumbersome to use, or may not provide sufficient positional stiffness needed for optical telecommunications systems.

SUMMARY OF THE INVENTION

One aspect of the invention provides an apparatus having an outer element. An inner element is positioned interior to the outer element and is coupled to the outer element by a first pivot element. A second pivot element is coupled interior to the inner element and is coupleable to an electro-optical telecommunication device. The first pivot element is positioned to allow movement of the inner element about a first axis, and the second pivot element is positioned to allow movement of the electro-optical telecommunication device about a second axis.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of an apparatus and method to mount electro-optic systems are described herein. In the following description, some specific details are provided, so as to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention provides a mount for an electro-optic system, such as an optical transceiver system, which can be used to compensate for motion that affects alignment with respect to an optical communication signal. In one embodiment, the mount comprises a pair of concentric rings having pivots spaced 90 degrees apart relative to each other. The outer ring is fixed, and the inner ring is capable of movement. The electro-optic system is pivotally coupled to the inner ring and is also capable of movement. A first set of pivot elements between the inner ring and the outer ring allows rotation about a first axis, while a second set of pivot elements between the electro-optic system and the inner ring allows rotation about a second axis, typically orthogonal or different to the first axis in one embodiment.

Figure 1:
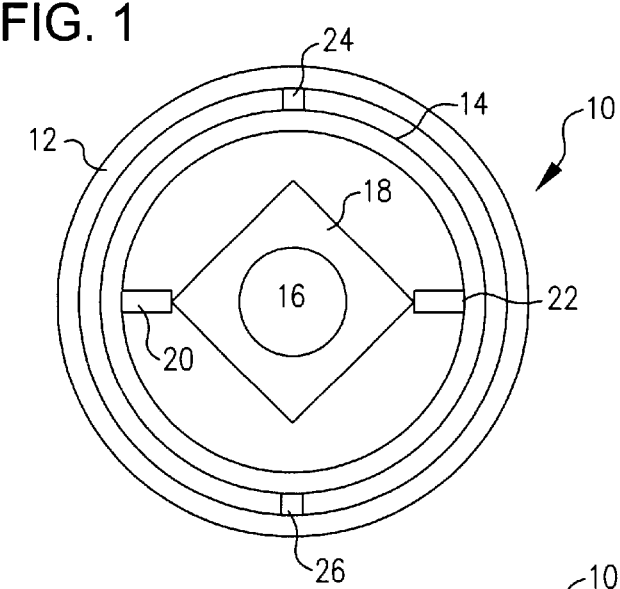
FIG. 1 is a front view of an apparatus according to an embodiment of the invention.

Referring first to FIG. 1, shown generally at 10 is a front view of a mount according to one embodiment of the invention. The mount 10 includes an outer element 12 and an inner element 14. In the embodiment of the mount 10 shown in FIG. 1, the outer element 12 and the inner element 14 are in the form of concentric circular rings. It is to be appreciated that in other embodiments, the outer element 12 and the inner element 14 can have square, elliptical, rectangular, polygonal, etc. shapes. Furthermore, the outer element 12 and the inner element 14 do not have to be the same shape. The outer element 12 and the inner element 14 can be made from any number of suitable materials and methods, including rolled sheet metal stock, metal cast into shape, rigid plastic, etc.

In one embodiment, the outer element 12 is fixed in position by being attached to a building or some other stationary structure, for example. The inner element 14 is capable of movement, such as out-of-plane rotation anywhere between 0 degrees and 180 degrees relative to the plane of the outer element 12. According to an embodiment, the inner element 14 can rotate within example ranges of ±3–5 degrees or ±30–45 degrees. An example size of the outer element 12 is a diameter of 22–24 inches, and it is to be appreciated that these ranges of rotation and dimensions can vary from one implementation to another.

An electro-optic system 16 is disposed at the center of the inner element 14. The electro-optic system 16 can include any type of device that may need positional adjustment to compensate for building sway, wind, vibrations, or other disturbances that may affect its optimal position. The optical system 16 can include transmitter systems, receiver systems, transceiver systems, routers, mirroring devices, or other components usable for a wireless optical telecommunication system. The electro-optic system 16 may include (or may be mounted on) a platform 18, or the electro-optic system 16 may be pivotally coupled to the inner element 14 using other methods.

To provide for movement of the inner element 14 and of the electro-optic system 16 (e.g., the platform 18), the mount 10 includes a plurality of pivot elements. A first pair of pivot elements 20 and 22 pivotally couples the electro-optic system 16 to the inner element 14. According to an embodiment, the pivot elements 20 and 22 are oriented 180 degrees apart. A second pair of pivot elements 24 and 26 pivotally couples the inner element 14 to the outer element 12. In one embodiment, the pivot elements 24 and 26 are oriented 180 degrees apart, and are oriented 90 degrees relative to the pivot elements 20 and 22. Examples of components that can be used for the pivot elements 20, 22, 24, and 26 include, but are not limited to, ball bearings, rolling element bearings, or flexures.

Thus, the mount 10 allows rotation or movement of the electro-optic system 16 about a first axis defined by the pivot elements 20 and 22, and rotation or movement about an orthogonal second axis defined by the pivot elements 24 and 26. In this manner, rotation about the first axis can provide elevational adjustment, while rotation about the second axis can provide azimuthal adjustment (or vice versa).

Figure 2:
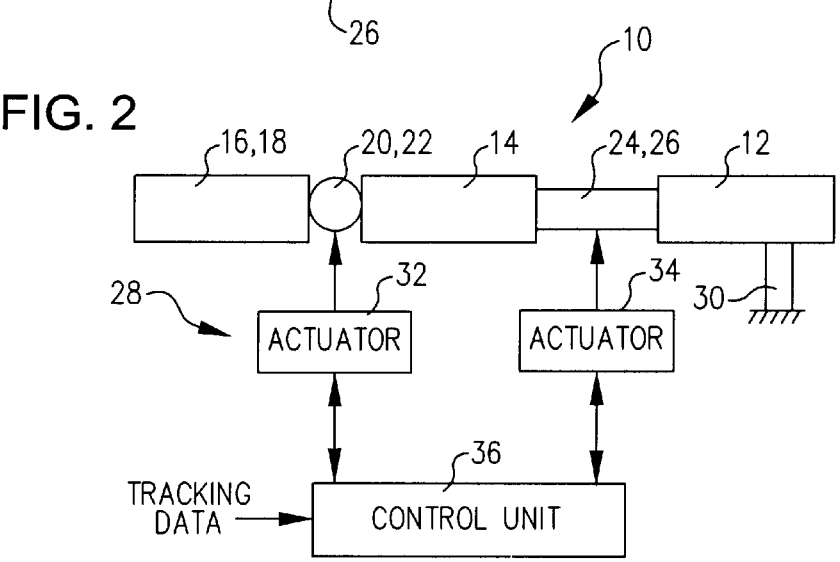
FIG. 2 is a block diagram of an embodiment of a drive mechanism for the apparatus of FIG. 1.

FIG. 2 is a block diagram (partial sectional side view) of an embodiment of a drive mechanism 28 that can be used to trigger movement of the components of the mount 10 about the first and second axes. The outer element 12 is fixed in position by an anchor 30. A first actuator 32 is coupled to provide rotational movement between the inner element 14 and the electro-optic system 16 (e.g., the platform 18) about the pivot elements 20 and 22, in one embodiment. In another embodiment, separate actuators 32 are located in close proximity to each of the pivot elements 20 and 22. Similarly, a second actuator 34 is coupled to provide rotational movement between the inner element 14 and the outer element 12 about the pivot elements 24 and 26, in an embodiment. In another embodiment, separate actuators 34 are located in close proximity to each of the pivot elements 24 and 26.

A control unit 36 controls the actuators 32 and 34. The control unit 36 receives tracking data, indicative of the alignment of the electro-optic system 16 to an optical communication signal/beam, from the electro-optic system 16 or from another system. The control unit 36 then uses this received tracking data to determine the type (e.g., elevational or azimuthal) or amount of positional adjustment necessary for the electro-optic system 16 to optimize alignment to the communication signal/beam. Once the control unit 36 determines this information, the control unit 36 triggers the actuator 32 and/or the actuator 34 to cause rotation about their respective pivot elements by an appropriate amount.

In an embodiment of the drive mechanism 28, the actuators 32 and 34 apply their forces through the rotation axes of the pivot elements 20, 22, 24, and 26. In this embodiment, therefore, the pivot elements 20, 22, 24, and 26 have an active rotational role since the forces that cause movement are being applied through them.

Figure 3:
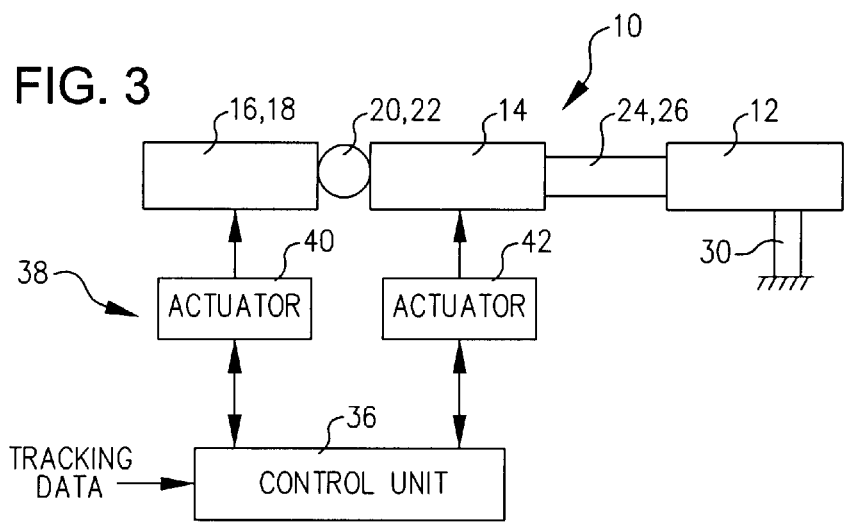
FIG. 3 is a block diagram of another embodiment of a drive mechanism for the apparatus of FIG. 1.

FIG. 3 is a block diagram (partial sectional side view) of another embodiment of a drive mechanism 38 that can be used to trigger movement of the components of the mount 10 about the first and second axes. A first actuator 40 is coupled to provide pivotal movement of the electro-optic system 16 (or the platform 18). The first actuator 40 is attached between the electro-optic system 16 and the anchor 30. A second actuator 42 is coupled to provide pivotal movement to the inner element 14. The second actuator 42 is attached between the inner element 14 and the anchor 30. As before, the control unit 36 triggers the actuator 40 and/or the actuator 42 to move their corresponding component based on the received tracking data.

In one embodiment of the drive mechanism 38, the actuators 40 and 42 apply their forces to components of the mount 10 and not to the pivot elements 20, 22, 24, and 26. In this embodiment, therefore, the pivot elements 20, 22, 24, and 26 have more of a passive rotational role, since the forces to cause movement are being applied elsewhere on the mount 10.

It is to be appreciated that it is possible to combine the embodiments of the drive mechanisms 28 and 38 of FIGS. 2 and 3, respectively. Thus, an embodiment may include one or more actuators that can provide rotational movement to one or more of the pivot elements 20, 22, 24, and 26, while one or more actuators can apply forces elsewhere to the mount 10 (e.g., to the inner element 14).

According to an embodiment of the drive mechanism 28 and/or the drive mechanism 38, the forces applied to components of the mount 10 can be mechanical forces. These mechanical forces can be applied using rotary actuator drive mechanisms, linear actuator drive mechanisms, worm gear drive mechanisms, spurr gear drive mechanisms, etc. In other embodiments, the forces that cause movement may be non-mechanical. For example, electro-static or electromagnetic forces (such as those that can result from applied electrical currents or electrical fields) may be used in these other embodiments to trigger rotational motion.

Figure 4:
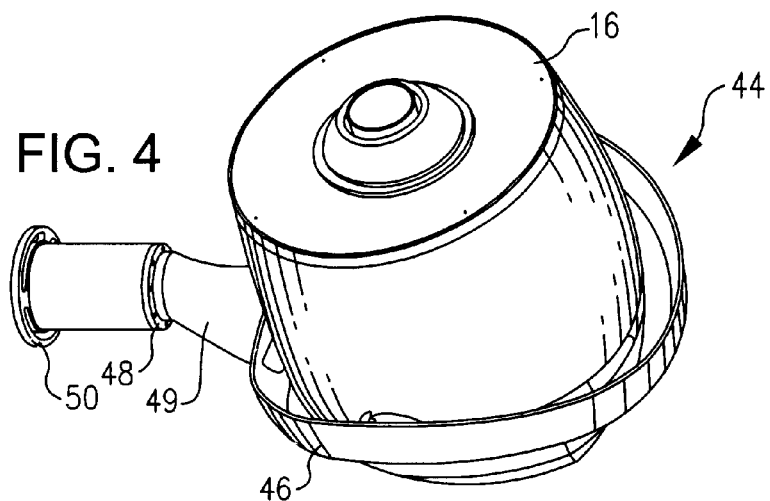
FIGS. 4–6 are perspective views of an apparatus according to another embodiment of the invention.
Figure 5:
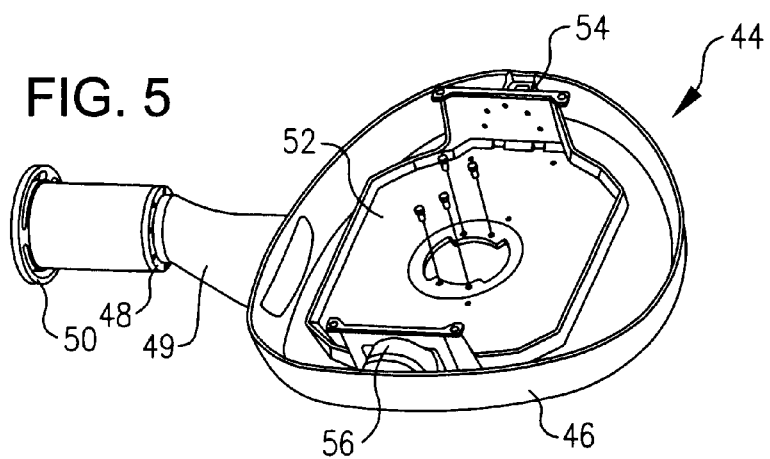
Figure 6:
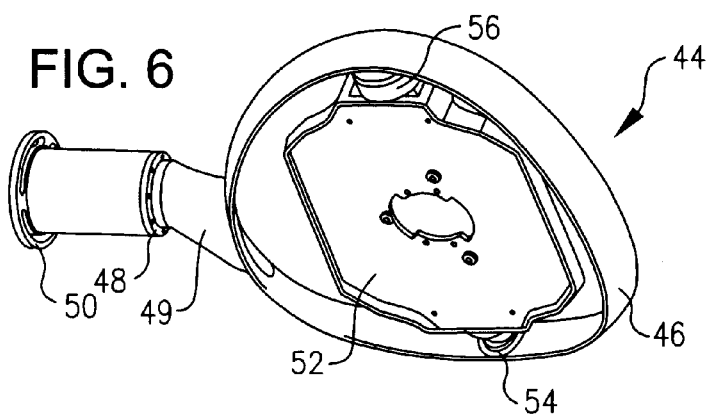

Another embodiment of a mount 44 that can be used to mount the electro-optic system 16 is shown in FIGS. 4–6. The mount 44 includes an outer element 46 that is pivotally attached by a pivot element 48 to an anchor 50. The outer element may include a stem 49 that is coupled to the pivot element 48. The anchor 50 can be fixed to a stationary structure, such as a wall of a building.

As shown in FIGS. 5–6, an inner element 52 is disposed within the outer element 46. The inner element 52 can comprise a plate-like structure or other structure to which the electro-optic system 16 can be attached. A pair of pivot elements 54 and 56, spaced 180 degrees apart, couples the inner element 52 to the outer element 46. The pivot elements 54 and 56 are located 90 degrees relative to the pivot element 48. As illustrated in FIG. 6, rotation of the outer element 46 about the pivot element 48 provides positional change(s) about a first axis. Rotation of the inner element 52 via the pivot elements 54 and 56 can provide positional change(s) about a second axis orthogonal to the first axis, or about an axis different from the first axis. The control unit 36 and appropriate actuator(s), such as actuators similar to those shown in FIGS. 2–3, can trigger appropriate rotation/movement of the inner element 52 and/or of the outer element 46. In this manner, elevational and azimuthal adjustments for the electro-optic system 16 can be obtained. The type and amount of adjustments can vary from one implementation to another, based on factors such as the size of the electro-optic system 10 fitted on to the inner element 52, the interior diameter of the outer element 46, etc.

Figure 7:
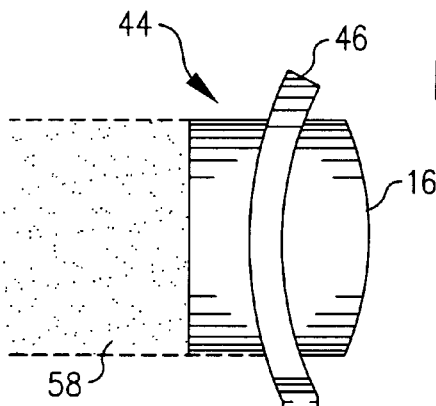
FIGS. 7–9 are side views illustrating operation of the embodiment of the apparatus shown in FIGS. 4–6.
Figure 8:
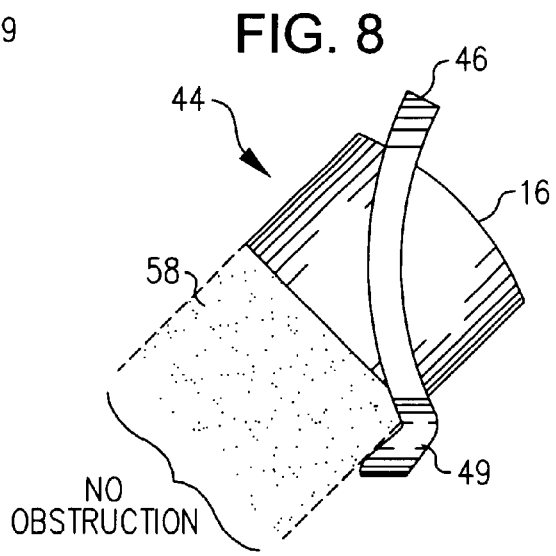
Figure 9:
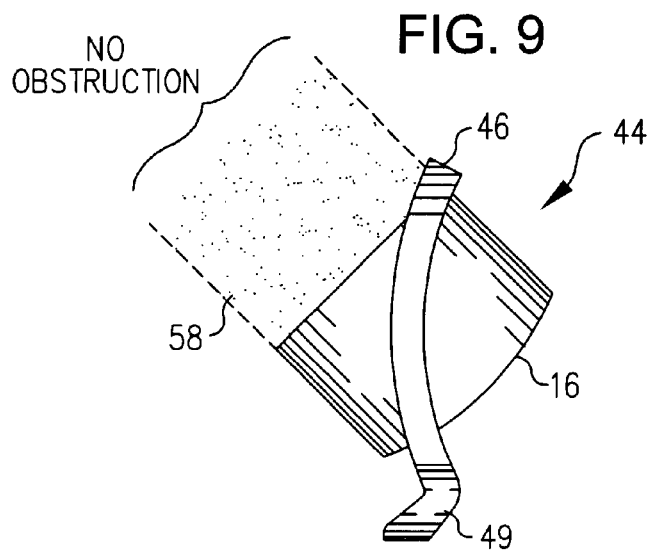

In an embodiment, the outer element 46 is shaped to allow clearance of the electro-optic system 16 (or to allow unobstructed clearance of its optical path) if the electro-optic system 16 is rotated about the second axis. FIGS. 7–9 illustrates this in further detail. FIG. 7 shows an orientation of the electro-optic system 16 in an non-rotated position, with an optical path 58 of the electro-optic system 16 pointing in a substantially horizontal (and unobstructed) direction.

FIG. 8 shows that the shape of the stem 49 and/or of the ring portion of the outer element 46 allows the electro-optic system 16 to swing/rotate to a maximum position, without having any obstruction of the optical path 58 and with adequate clearance for the electro-optic system 16 itself. FIG. 9 shows that there is also adequate clearance when the electro-optic system 16 swings towards another maximum position.

According to an embodiment of the invention, the shape of the ring portion of the outer element 46 is arcuate to allow the electro-optic system 16 to rotate unimpeded within a range ±45 degrees, for example. Additionally, the arcuate shape of the ring portion of the outer element 46 allows the major diameter of the outer element to be minimized or reduced, thereby contributing to the compactness of the mount 44. In contrast, an embodiment having a non-curved ring shape has a diameter that is larger (e.g., 20% larger for instance) to insure that there is no obstruction of the optical path 58.

In an embodiment, the shape of the stem 49 may also be arcuate or have a shape that is consistent with the shape of the ring portion of the outer element 46 to provide the appropriate clearance. As is also evident from viewing FIGS. 7–9, the stem 49 can be shaped, in an embodiment, to support and evenly distribute the weight of the electro-optic system 16 on the anchor 50.

In conclusion, one embodiment of the invention provides a gimbal-type configuration of the mount 10 that can be used to adjust a position of the electro-optic system 16. A round form factor of one embodiment of the mount 10 is both aesthetically pleasing and compact due to its efficient use of material for stiffness. Embodiments of the mount 10 can also provide optimization for limited field-of-regard applications.

Also, one embodiment of the mount 10 can provide a small form factor relative to the size of the electro-optic system 16 being positioned. This provides improvements over existing bulky and large mounting systems because an embodiment of the mount 10 uses simple pivot elements and actuators, uses minimal part control, and is less expensive to manufacture and maintain. Furthermore, an embodiment of the mount 10 provides high stiffness due to all-around support, and thus improves on yoke structures that are currently used.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For instance, while FIGS. 1–6 above show various configurations for the mount 10, it is to be appreciated that these configurations are not necessarily drawn to scale. The various widths, thickness, shapes, etc. of the various components of the mount 10 may be changed to accommodate certain implementations. As an example, the width and thickness of the outer element 12 and of the inner element 14 of FIGS. 1–3 may be greater in implementations where the electro-optic system 16 has a heavy weight.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system, comprising:
   an electro-optical telecommunication device; and
   an apparatus to mount the electro-optical device, the apparatus including:
      an outer element;
      an inner element positioned interior to the outer element and coupled to the outer element by a first pivot element, the inner element being coupled to the electro-optical telecommunication device;
      a second pivot element coupled to the outer element and positioned to allow movement of the outer element about a first axis, the first pivot element being positioned to allow movement of the electro-optical telecommunication device about a second axis different from the first axis; and
      an anchor coupled to the outer element by the second pivot element.

2. The system of claim 1 wherein the electro-optical telecommunication device comprises a transceiver device.

3. The system of claim 1, further comprising:
   a first actuator coupled to the first pivot element to provide rotational motion about the first pivot element;
   a second actuator coupled to the second pivot element to provide rotational motion about the second pivot element; and
   a control unit communicatively coupled to the first and second actuators to trigger the first or the second actuator to provide their corresponding rotational motion about the pivot elements, the control unit being capable to process tracking data received from the electro-optical telecommunication device to select the first or the second actuator for activation and to determine an amount of rotational motion.

4. The system of claim 1, further comprising:

an actuator coupled to the inner element to provide motion to the inner element; and a control unit communicatively coupled to the actuator to trigger the actuator to provide motion to the inner element, the control unit being capable to process tracking data received from the electro-optical telecommunication device to determine an amount of motion to be provided by the actuator.

5. The system of claim 1 wherein the movement about the first axis provides azimuthal adjustment for the electro-optical telecommunication device and wherein the movement about the second axis provides elevational adjustment for the electro-optical telecommunication device.

6. A method, comprising:

positioning an inner element interior to an outer element and coupling the inner element to the outer element by a first pivot element;

mounting an electro-optical telecommunications device to the inner element;

mounting an anchor to a rigid structure;

pivotally coupling the outer element to the anchor by a second pivot element;

positioning the first pivot element to allow movement of the inner element about a first axis; and positioning the second pivot element to allow movement of the electro-optical telecommunication device about a second axis.

7. The method of claim 6, further comprising:

providing rotational motion about the first pivot element;

providing rotational motion about the second pivot element; and selecting rotational motion about the first pivot element or about the second pivot element based on tracking data received from the electro-optical telecommunication device and using the received tracking data to determine an amount of rotational motion.

8. The method of claim 6, further comprising:

directly providing rotational motion to the inner element based on tracking data received from the electro-optical telecommunication device; and using the received tracking data to determine an amount of rotational motion.

9. An apparatus, comprising:

an outer element;

an inner element positioned interior to the outer element and coupled to the outer element by a first pivot element, the inner element being coupleable to an electro-optical telecommunication device;

a second pivot element coupled to the outer element and positioned to allow movement of the outer element about a first axis, the first pivot element being positioned to allow movement of the electro-optical telecommunication device about a second axis different from the first axis; and an anchor coupled to the outer element by the second pivot element.

10. The apparatus of claim 9 wherein the outer element includes a stem coupled to the second pivot element, the stem being shaped to provide clearance for an optical path of the electro-optical telecommunication device if the electro-optical telecommunication device moves about the second axis.

11. The apparatus of claim 9 wherein the outer element includes a stem coupled to the second pivot element, the stem being shaped to distribute weight of the electro-optical telecommunication device.

12. The apparatus of claim 9 wherein the outer element is shaped to provide clearance for an optical path of the electro-optical telecommunication device if the electro-optical telecommunication device moves about the second axis.

13. The apparatus of claim 9 wherein the outer element is shaped to provide clearance for the electro-optical telecommunication device if the electro-optical telecommunication device moves about the second axis.

14. The apparatus of claim 12 wherein the shape of the outer element to provide clearance comprises an arcuate shape.

* * * * *

UNITED STATES PATENT AND TRADEMARK OFFICE
CERTIFICATE OF CORRECTION

PATENT NO.   : 6,417,976 B1
DATED        : July 9, 2002
INVENTOR(S)  : Schuster

It is certified that error appears in the above-identified patent and that said Letters Patent is hereby corrected as shown below:

<u>Title page,</u>
Item [56], References Cited, U.S. PATENT DOCUMENTS, "6,259,571" reference, please delete "Holder" and insert -- Holderer --.

Signed and Sealed this

First Day of June, 2004

JON W. DUDAS
*Acting Director of the United States Patent and Trademark Office*